(12) United States Patent
Huang et al.

(10) Patent No.: US 11,099,156 B2
(45) Date of Patent: Aug. 24, 2021

(54) METHOD AND DEVICE FOR DETECTING AND EVALUATING DEFECT

(71) Applicant: Tsinghua University, Beijing (CN)

(72) Inventors: Songling Huang, Beijing (CN); Wei Zhao, Beijing (CN); Shen Wang, Beijing (CN); Xinjie Yu, Beijing (CN); Lisha Peng, Beijing (CN); Jun Zou, Beijing (CN); Fuping Wang, Beijing (CN); Jiarui Dong, Beijing (CN); Lin Gui, Beijing (CN); Yue Long, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 218 days.

(21) Appl. No.: 16/403,990

(22) Filed: May 6, 2019

(65) Prior Publication Data
US 2020/0003729 A1 Jan. 2, 2020

(30) Foreign Application Priority Data

Jun. 29, 2018 (CN) .......................... 201810711896.2

(51) Int. Cl.
*G01N 27/83* (2006.01)
*G01N 17/00* (2006.01)
*G01N 27/02* (2006.01)
*G01N 27/90* (2021.01)

(52) U.S. Cl.
CPC .......... *G01N 27/83* (2013.01); *G01N 17/006* (2013.01); *G01N 27/023* (2013.01); *G01N 27/9046* (2013.01)

(58) Field of Classification Search
CPC ....... G01R 33/10; G01N 27/83; G01N 27/023
See application file for complete search history.

(56) References Cited

U.S. PATENT DOCUMENTS

| 7,573,261 | B1 * | 8/2009 | Vinogradov | ........... G01N 27/82 324/240 |
|---|---|---|---|---|
| 2010/0307249 | A1 * | 12/2010 | Lesage | ............... G01N 29/4445 73/623 |
| 2011/0017541 | A1 * | 1/2011 | He | ........................ B62K 5/007 180/291 |
| 2016/0160629 | A1 * | 6/2016 | Donderici | ............... E21B 47/00 324/238 |

* cited by examiner

*Primary Examiner* — Matthew G Marini
(74) *Attorney, Agent, or Firm* — Hodgson Russ LLP

(57) ABSTRACT

The present disclosure provides a method and a device for detecting and evaluating a defect with electromagnetic multi-field coupling. The method includes magnetizing a pipeline with the electromagnetic multi-field coupling; detecting a defect of the pipeline along an axial direction of the pipeline at a constant speed; collecting signals at a position of the defect to obtain magnetic leakage signals in three dimensions and an electrical impedance signal; pre-processing the collected signals; decoupling the pre-processed signals, to obtain decoupled magnetic leakage signals and a decoupled electrical impedance signal; performing impedance analysis on the decoupled electrical impedance signal, and determining a type of the defect based on a phase angle of the decoupled electrical impedance signal; and performing quantification analysis on the decoupled magnetic leakage signals and performing quantification evaluation on a size of the defect using a neural network defect quantification method.

13 Claims, 4 Drawing Sheets

METHOD AND DEVICE FOR DETECTING AND EVALUATING DEFECT

CROSS-REFERENCE TO RELATED APPLICATION

This application is based upon and claims a priority to Chinese Patent Application Serial No. 201810711896.2, filed with the State Intellectual Property Office of P. R. China on Jun. 29, 2018, the entire contents of which are incorporated herein by reference.

TECHNICAL FIELD

The present disclosure generally relates to a field of an electromagnetic nondestructive detection technology, and more particular to a method and a device for detecting and evaluating defects with electromagnetic multi-field coupling.

BACKGROUND

In respect to electromagnetic nondestructive detection, detection and evaluation on defects of ferromagnetic materials, such as pipes, is a basis for safety assessment of a tested workpiece.

SUMMARY

Embodiments of the present disclosure seek to solve at least one of the problems existing in the related art to at least some extent.

Accordingly, an objective of the present disclosure provides a method for detecting and evaluating defect with electromagnetic multi-field coupling. The method includes:

magnetizing a pipeline to be detected with the electromagnetic multi-field coupling;

detecting a defect of the pipeline along an axial direction of the pipeline at a constant speed;

collecting signals at a position of the defect to obtain magnetic leakage signals in three dimensions at the position and an electrical impedance signal at the position;

pre-processing the magnetic leakage signals in three dimensions and the electrical impedance signal;

decoupling the pre-processed magnetic leakage signals in three dimensions and the electrical impedance signal, to obtain decoupled magnetic leakage signals in three dimensions and a decoupled electrical impedance signal;

performing impedance analysis on the decoupled electrical impedance signal, and determining a type of the defect based on a phase angle of the decoupled electrical impedance signal; and performing quantification analysis on the decoupled magnetic leakage signals and performing quantification evaluation on a size of the defect using a neural network defect quantification method.

In addition, another objective of the present disclosure provides a device for detecting and evaluating defect with electromagnetic multi-field coupling. The device includes: a magnetizing circuit, for magnetizing a pipeline to be detected with the electromagnetic multi-field coupling; a detector, for detecting a defect of the pipeline along an axial direction of the pipeline at a constant speed; a signal collecting circuit, for collecting signals at a position of the defect to obtain magnetic leakage signals in three dimensions at the position and an electrical impedance signal at the position; a signal processing circuit, for pre-processing the magnetic leakage signals in three dimensions and the electrical impedance signal; and a processor, configured to decouple the pre-processed magnetic leakage signals in three dimensions and the electrical impedance signal, to obtain decoupled magnetic leakage signals in three dimensions and a decoupled electrical impedance signal; perform impedance analysis on the decoupled electrical impedance signal and determine a type of the defect based on a phase angle of the decoupled electrical impedance signal; and perform quantification analysis on the decoupled magnetic leakage signals and perform quantification evaluation on a size of the defect using a neural network defect quantification method.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
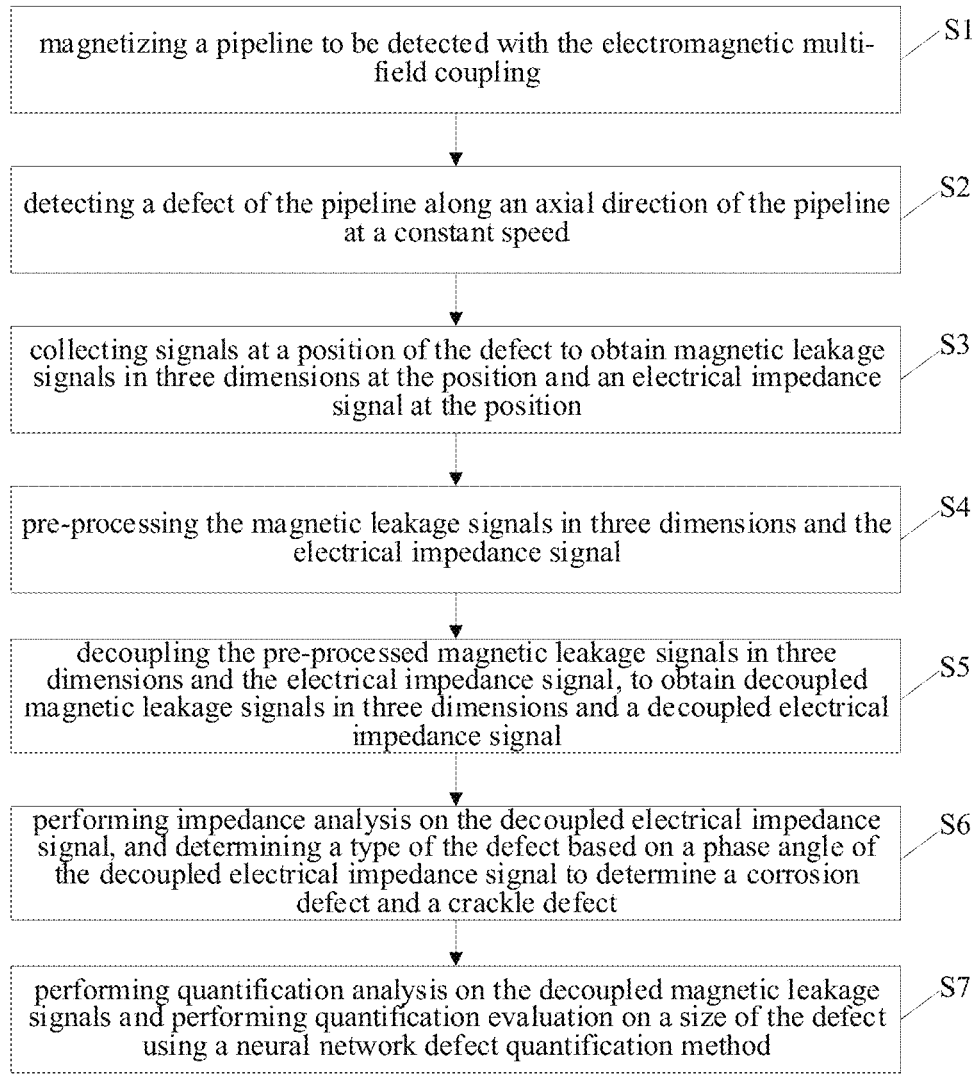
FIG. 1 is a flowchart illustrating a method for detecting and evaluating defects with electromagnetic multi-field coupling according to embodiments of the present disclosure.

Reference will now be made in detail to exemplary embodiments, examples of which are illustrated in the accompanying drawings. The same or similar elements and elements having same or similar functions are denoted by like reference numerals throughout the descriptions. The embodiments described herein with reference to the accompanying drawings are explanatory and used to generally understand the present disclosure, which is not construed to limit the embodiments of the present disclosure.

In respect to electromagnetic nondestructive detection, detection and evaluation on defects of ferromagnetic materials, such as pipes, is a basis for safety assessment of a tested workpiece. Most common types of defects include a corrosion defect and a crackle defect. The Corrosion defect most likely occurs during usage of a pipeline for example, formed of ferromagnetic materials, which may cause failure or damage to the workpiece. The crackle defect is one of most dangerous defects during usage of the pipeline for example, formed of ferromagnetic materials, which is a reason causing brittle failure of the workpiece. The brittle failure of the workpiece may in turn promotes further crack growth. Therefore, detections on the corrosion defect and the crackle defect are of great significance. However, existing magnetic flux leakage detection technology can only detect corrosion defects, and it is difficult to effectively detect crack defects.

In the related art, a method for judging a pipeline crackle defect of a circular welding crack type with triaxial magnetic leakage internal detection line signals, uses the triaxial magnetic leakage detection line signals of high precision to determine a size of the pipeline crackle defect of the circular welding crack type. The method may only identify and judge the pipeline crackle defect of the circular welding crack type, but cannot effectively identify other defects, such as fatigue crack, corrosion crack and the like at a location other than the location of the circular welding crack. In addition, a method for detecting inner or outer wall defect with leakage magnetization based on composition magnetization of alternating current and direct current, uses the manner of composition magnetization of alternating current and direct current to identify the defect. However, this method may only identify inner or outer wall defect, but cannot distinguish the corrosion defect from the crackle defect, thereby failing to perform quantitative evaluation on the defect.

Therefore, embodiments of the present disclosure provide a method and a device for detecting and evaluating defects with electromagnetic multi-field coupling. The method and the device according to embodiments of the present disclosure will be described with reference to drawings.

FIG. 1 is a flowchart illustrating a method for detecting and evaluating defects with electromagnetic multi-field coupling according to embodiments of the present disclosure.

As illustrated in FIG. 1, the method may include the following.

At block S1, a pipeline to be detected is magnetized with electromagnetic multi-field coupling.

Further, in an implementation of the present disclosure, magnetizing the pipeline to be detected with the electromagnetic multi-field coupling includes providing a saturated direct-current (DC) magnetization field through a permanent magnet or a DC coil, and providing a high-frequency alternative-current (AC) magnetization field through an AC coil. A high-frequency AC excitation signal for providing the high-frequency AC magnetization field has a frequency in the range of 20-100 kHz, and a direct of the AC magnetization is along a radial direction of the pipeline while a direction of the DC magnetization is along an axial direction of the pipeline.

It may be understood that, as illustrated in FIG. 1, in the method, the pipeline to be detected may be magnetized with the electromagnetic multi-filed coupling by providing the saturated DC magnetization field via the permanent magnet or the DC coil, and by providing the high-frequency AC magnetization field via the AC coil.

Figure 2:
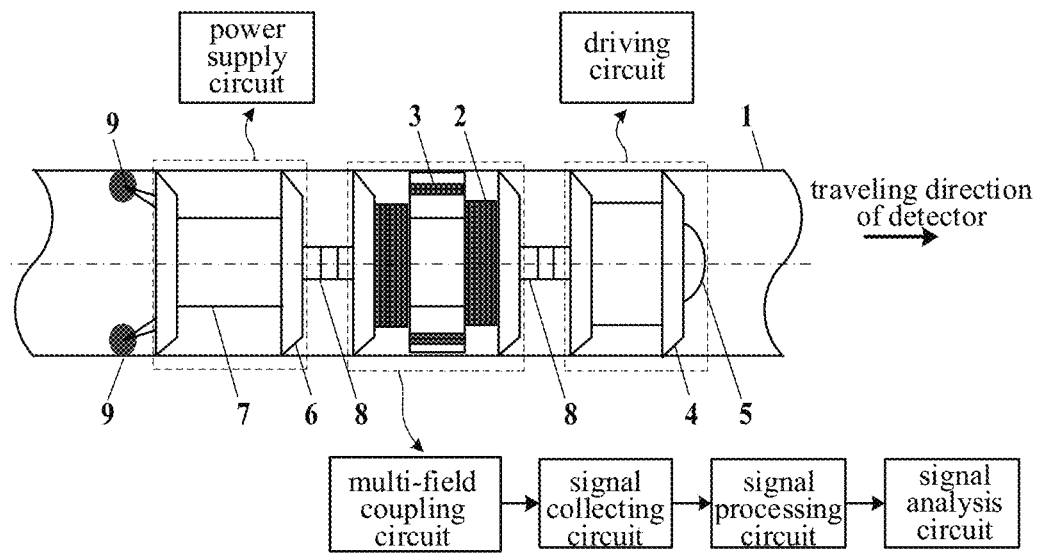
FIG. 2 is a schematic diagram illustrating a device for detecting and evaluating defects with electromagnetic multi-field coupling according to embodiments of the present disclosure.

In detail, as illustrated in FIG. 2, the pipeline to be detected is magnetized by a multi-field coupling magnetizing circuit with electromagnetic multi-field coupling. The multi-field coupling magnetizing circuit includes a permanent magnet or a DC coil for providing the saturated DC magnetization field, and an AC coil for providing the high-frequency AC magnetization field. The frequency of a high-frequency AC excitation signal provided by the AC coil may be within a range of 20-100 kHz. A direct of the AC magnetization is along the radial direction of the pipeline, while a direction of the DC magnetization is along the axial direction of the pipeline.

Further, in implementations of the present disclosure, the pipeline 1 to be detected is magnetized by providing the saturated DC magnetization field via the permanent magnet 2 and by providing the high-frequency AC magnetization field via the AC coil 3. The direction of the DC magnetization is long the axial direction of the pipeline, the direction of the AC magnetization is along the radial direction of the pipeline, and the frequency of the high-frequency AC excitation signal is 65 kHz.

Figure 3:
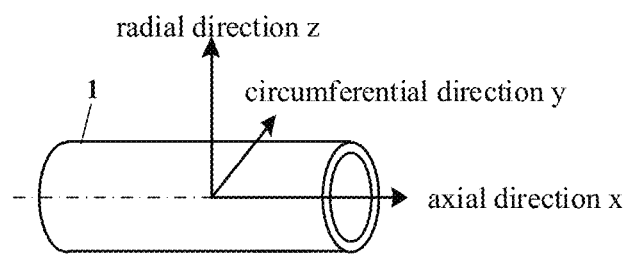
FIG. 3 is a schematic diagram illustrating an axial direction, a circumferential direction and a radial direction of a pipeline according to embodiments of the present disclosure.
Figure 4:
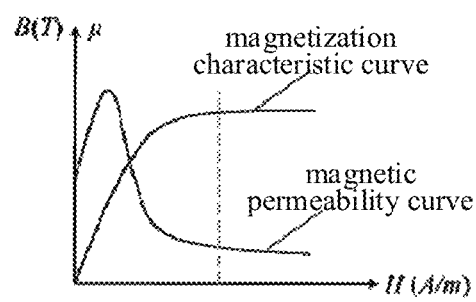
FIG. 4 is a schematic diagram illustrating a magnetization characteristic curve and a magnetic permeability curve according to embodiments of the present disclosure.

FIG. 3 is a diagram illustrating an axial direction, a circumferential direction, and a radial direction of the pipeline. FIG. 4 is a diagram illustrating a magnetization characteristic curve and a magnetic permeability curve of the pipeline. As can be seen from the drawings, with saturated magnetization, the magnetic permeability $\mu$ of the pipeline is significantly reduced. It may be known from a skin depth formula $\delta=\sqrt{1/\pi f \mu \xi}$, where f denotes an excitation frequency and $\xi$ denotes the magnetic permeability of the pipeline 1, that the skin depth of eddy current is significantly increased, thereby realizing an effective detection on the defects of the whole wall of the pipeline.

At block S2, along the axial direction of the pipeline, the detection on a defect of the pipeline is performed at a constant speed.

It may be understood that, as illustrated in FIG. 1, the defect of the pipeline is detected by a detector which travels along the axial direction of the pipeline 1 at the constant speed. The speed of the detector is about 1.0 m/s. A driver for driving the detector includes a driving sealing cup 4 and an anti-collision element 5. The driving sealing cup 4 contacts the pipeline 1 closely. When a pressure difference is generated at two sides of the driving sealing cup 4, the detector is driven by the pressure difference. In addition, a power supply of the detector includes a support sealing cup 6 and a battery pack 7, for supplying power to the detector. The driver and the power supply are connected to other elements via a universal joint 8. An odometer 9 is configured to record the mileage of the detection.

At block S3, signals at a position the defect are collected to obtain magnetic leakage signals in three dimensions at the position and an electrical impedance signal at the position.

It may be understood that, as illustrated in FIG. 1, a signal collecting circuit may be used to collect the signals at the position of the defect in implementations of the present disclosure. For example, the signal collecting circuit may include a magnetic sensor and a detection coil. The magnetic sensor is configured to detect intensities of the leaked magnetic fields at the position of the defect. The detection coil may be configured to convert the magnetic field signal at the position of the defect into the electrical impedance signal and collect the electrical impedance signal.

Further, in an implementation of the present disclosure, collecting signals at the position of the defect further includes detecting intensities of leaked magnetic fields along an axial direction, a circumferential direction and a radial direction of the pipeline generated by a spatial magnetic field.

It may be understood that, as illustrated in FIG. 2, the signal collecting circuit includes a tri-dimensional magnetic sensor, for detecting intensities of leaked magnetic fields along an axial direction, a circumferential direction and a radial direction of the pipeline.

Figure 5:
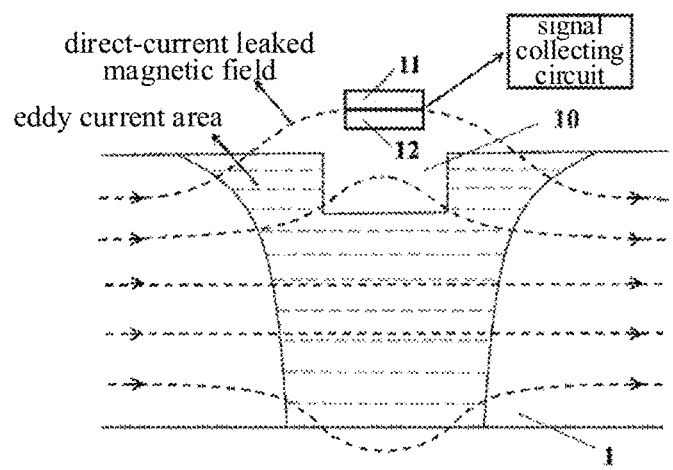
FIG. 5 is a schematic diagram illustrating collecting a signal under magnetization of multi-filed coupling according to embodiments of the present disclosure.

In detail, as illustrated in FIG. 2, the signal collecting circuit is used to collect the signals at the position of the defect 10. The signal collecting under magnetization with the multi-field coupling is illustrated as FIG. 5. The signal collecting circuit includes a tri-dimensional magnetic sensor 11 and a detection coil 12. The tri-dimensional sensor 11 may be configured to simultaneously detect the intensities of leaked magnetic fields along an axial direction, a circumferential direction and a radial direction of the pipeline generated by a spatial magnetic field. The detection coil 12 is configured to convert the magnetic field signal at the position of the defect 10 into an electrical impedance signal and collect the electrical impedance signal.

At block S4, the magnetic leakage signals in three dimensions at the position of the defect and the electrical impedance signal at the position of the defect are pre-processed.

It may be understood that, as illustrated in FIG. 1, the magnetic leakage signals and the electronic impedance signal may be processed by a signal processing circuit. The pre-processing includes amplifying, filtering, and analog-to-digital conversion.

In detail, as illustrated in FIG. 2, in an implementation of the present disclosure, the signal processing circuit includes an amplifier, a filter and an analog-to-digital converter to process the magnetic leakage signals and the electrical impedance signal, to obtain pre-processed magnetic leakage signals $B_x$, $B_y$, and $B_z$ in three dimensions and a pre-processed electrical impedance signal E.

At block S5, the pre-processed magnetic electrical signals in three dimensions and the processed electrical impedance signal are decoupled, to obtain decoupled magnetic leakage signals in three dimensions and a decoupled electrical impedance signal.

For example, the decoupled electrical impedance signal is an eddy current signal.

It may be understood that, as illustrated in FIG. 1, the pre-processed magnetic leakage signals and the pre-processed electrical impedance signal are decoupled to obtain decoupled magnetic leakage signals in three dimensions and a decoupled electrical impedance signal.

Further, in an implementation of the present disclosure, a following formula may be used for decoupling the pre-processed magnetic leakage signals and the pre-processed electrical impedance signal:

$$B'_x = B_x$$
$$B'_y = B_y$$
$$B'_z = \frac{E/ns - \sqrt{2}\sin(\omega t + \varphi) \cdot \nabla B_z - \sqrt{2}\,\omega\cos(\omega t + \varphi)B_z}{1 - (\sqrt{2}\sin(\omega t + \varphi)) \cdot \nabla - \sqrt{2}\,\omega\cos(\omega t + \varphi)}$$
$$E' = E - ns \cdot \nabla B_z + \nabla \cdot \left( \frac{E/ns - \nabla B_z}{(\sqrt{2}\sin(\omega t + \varphi) - 1) \cdot \nabla + \sqrt{2}\,\omega\cos(\omega t + \varphi)} \right)$$

where, $B_x'$, $B_y'$ and $B_z'$ denotes the decoupled magnetic leakage signals in three dimensions, E' denotes the decoupled electrical impedance signal, x, y and z respectively denote an axial direction, a circumferential direction and a radial direction of the pipeline, $\omega$ and $\varphi$ respectively denote a frequency of an alternating-current excitation signal and an initial phase angle of the alternating-current excitation signal, n and s respectively denote a number of turns of a detection coil and an area of the detection coil, $\nabla$ is a differential operator, $B_x$, $B_y$ and Bz respectively denotes the pre-processed magnetic leakage signals in three dimensions, and E denotes the pre-processed electrical impedance signal.

In detail, in a signal analyzing circuit, such as a processor of a device for detecting and evaluating defect with electromagnetic multi-field coupling, the pre-processed magnetic leakage signals $B_x$, $B_y$ and $B_z$, and the pre-processed electrical impedance signal E are decoupled using the decoupling formula, to obtain the decoupled magnetic leakage signals and the decoupled electrical impedance signal. $\nabla B_z$ satisfies a following formula:

$$\nabla B_z = \frac{\partial B_z}{\partial t} = v \cdot \frac{\partial B_z}{\partial x}$$

where, v denotes a traveling speed of the detector while detecting the pipeline.

At block S6, an impedance analysis is performed on the decoupled electrical impedance signal, and a type of the defect is determined based on a phase angle of the decoupled electrical impedance signal to determine a corrosion defect and a crackle defect.

Further, in an implementation of the present disclosure, performing the impedance analysis on the decoupled electrical impedance signal and determining the type of the defect based on the phase angle of the decoupled electrical impedance signal include the following. An impedance plot is drawn based on the decoupled electrical impedance signal, and a phase angle $\alpha$ of the decoupled electrical impedance signal is calculated based on the impedance plot, where $\alpha \in [-90°, 90°]$. When $-60° < \alpha < 60°$, it is determined that the defect is the corrosion defect. When $-90° \leq \alpha \leq -60°$ or $60° \leq \alpha \leq 90°$, it is determined that the defect is the crackle defect.

In detail, in an implementation of the present disclosure, the impedance analysis is performed on the decoupled electrical impedance signal, and a type of the defect is determined based on the phase angle of the decoupled electrical impedance signal to determine the corrosion defect and the crackle defect. Through the calculation, the decoupled electrical impedance signal is obtained. The impedance plot is drawn that a horizontal coordinate is a real part of the decoupled electrical impedance signal and a longitudinal coordinate is an imaginary part of the decoupled electrical impedance signal. The phase angle $\alpha$ is also calculated that $\alpha \in [-90°, 90°]$.

When $-60° < \alpha < 60°$, it is determined that the defect is the corrosion defect.

When $-90° \leq \alpha \leq -60°$ or $60° \leq \alpha \leq 90°$, it is determined that the defect is the crackle defect.

Figure 6:
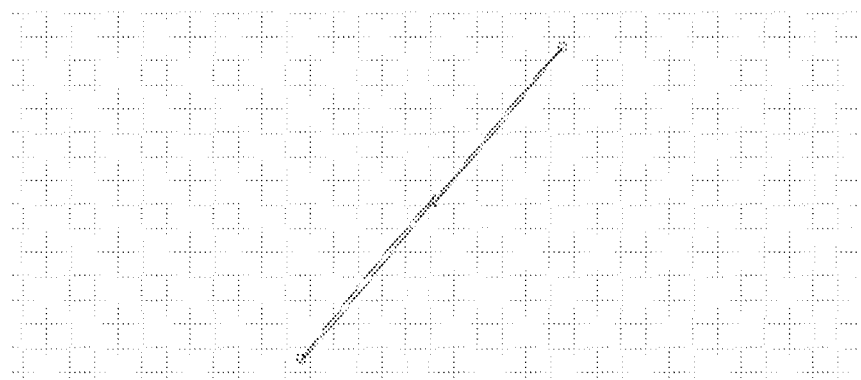
FIG. 6 is a diagram illustrating an impedance signal generated by a crackle defect according to embodiments of the present disclosure.
Figure 7:
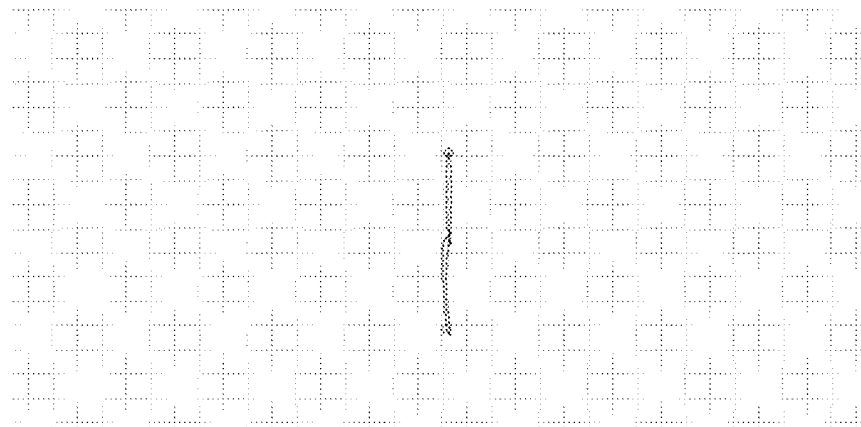
FIG. 7 is a diagram illustrating an impedance signal generated by a crackle defect according to embodiments of the present disclosure.

FIG. 6 is an impedance plot corresponding to the corrosion defect according to embodiments of the present disclosure, with the calculated phase angle of $\alpha_1 = 45.2°$ which satisfies the condition of the corrosion defect. FIG. 7 is another impedance plot corresponding to the crackle defect according to the embodiments of the present disclosure, with the calculated phase angle of $\alpha_2 = 89.7°$ which satisfies the condition of the crackle defect.

At block S7, quantification analysis is performed on the decoupled magnetic leakage signals, and quantification evaluation is performed on a size of the defect using neural network defect quantification method.

Further, in an implementation of the present disclosure, performing quantification analysis on the decoupled magnetic leakage signals and performing quantification evaluation on a size of the defect using a neural network defect quantification method further includes the following. With the neural network defect quantification method, a first neural network quantification model is established for the magnetic leakage signals of the corrosion defect and a second neural network quantification model is established for the magnetic leakage signals of the crackle defect. The second neural network quantification model is different from the first neural network quantification model. Each of the first neural network quantification model and the second neural network quantification model has an input of the decoupled magnetic leakage signals, and an output of quantitative values indicating length, width and depth of the defect.

It may be understood that, as illustrated in FIG. 2, after the type of the defect is identified, the quantification analysis is performed based on the decoupled magnetic leakage signals. With the neural network defect quantification method, a first neural network quantification model is established for the magnetic leakage signals of the corrosion defect and a second neural network quantification model is established for the magnetic leakage signals of the crackle defect. Each of the first neural network quantification model and the second neural network quantification model has an input of the decoupled magnetic leakage signals $B_z'$, $B_y'$ and $H_z'$, and an output of quantitative values indicating length, width and depth of the defect.

For example, the quantification analysis is performed on the decoupled magnetic leakage signals, and the quantification evaluation is performed on the size of the defect using the neural network defect quantification method. A first neural network quantification model is established for the magnetic leakage signals of the corrosion defect and a second neural network quantification model is established for the magnetic leakage signals of the crackle defect. Each of the first neural network quantification model and the second neural network quantification model has an input of the decoupled magnetic leakage signals $B_x'$, $B_y'$ and $H_z'$, to obtain the quantitative values 12.4 mm, 26.5 mm and 2.6 mm respectively indicating the length, the width and the depth of the corrosion defect and the quantitative values 25.6 mm and 3.4 mm respectively indicating the length and the depth of the crackle defect. The actual length, the actual width and the actual depth of the corrosion defect are respectively 12 mm, 26 mm and 2.4 mm, the actual length and the actual depth of the crackle defect are respectively 28 mm and 3.6 mm. As can be seen from implementations of the present disclosure, the method for detecting and evaluating the defect may quantify the size and type of the defect accurately.

With the method for detecting and evaluating the defect with the electromagnetic multi-field coupling according to embodiments of the present disclosure, the multi-field coupling and magnetization may improve multi-directional synchronous detection capability of acquiring defect information, and may comprehensively analyze and evaluate the defect in combination with the magnetic leakage signals and the electric impedance signal. The corrosion defect and the crackle defect in the pipeline may be detected simultaneously. After the type of the defect is determined, the size of the defect may be quantified based on the magnetic leakage signals. Therefore, comprehensive detection and evaluation on the defect may be realized, thereby avoiding a limitation that it is unable to effectively identify the crackle defect using a single magnetic leakage detection method, realizing a high reliability, fast detection speed, and automation. The method may be applied to detect and evaluate the defect of a ferromagnetic pipeline or steel plate, which has a broad application prospect.

The device for detecting and evaluating defect with electromagnetic multi-field coupling according to embodiments of the present disclosure will be described with reference to drawings.

Figure 8:
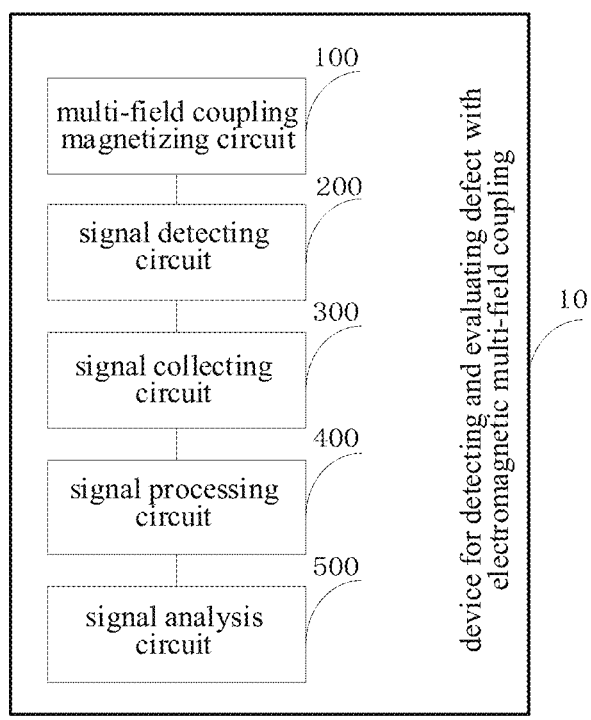
FIG. 8 is a schematic diagram illustrating a device for detecting and evaluating defects with electromagnetic multi-field coupling according to embodiments of the present disclosure.

FIG. 8 is a schematic diagram illustrating a device for detecting and evaluating defect with electromagnetic multi-field coupling according to embodiments of the present disclosure.

As illustrated in FIG. 8, the device 10 for detecting and evaluating defect with electromagnetic multi-field coupling includes a multi-field coupling magnetizing circuit 100, a signal detection circuit 200, a signal collecting circuit 300, a signal processing circuit 400 and a signal analysis circuit 500.

The multi-field coupling magnetizing circuit 100 is configured to magnetize a pipeline to be detected with the electromagnetic multi-field coupling. The signal detection circuit 200 is configured to detect a defect of the pipeline along an axial direction of the pipeline at a constant speed. The signal collecting circuit 300 is configured to collect signals at a position of the defect to obtain magnetic leakage signals in three dimensions at the position and an electrical impedance signal at the position. The signal processing circuit 400 is configured to pre-process the magnetic leakage signals in three dimensions and the electrical impedance signal. The signal analysis circuit 500 is configured to decouple the pre-processed magnetic leakage signals in three dimensions and the electrical impedance signal, to obtain decoupled magnetic leakage signals in three dimensions and a decoupled electrical impedance signal; perform impedance analysis on the decoupled electrical impedance signal and determine a type of the defect based on a phase angle of the decoupled electrical impedance signal; and perform quantification analysis on the decoupled magnetic leakage signals and perform quantification evaluation on a size of the defect using a neural network defect quantification method. The device 10 according to embodiments of the present disclosure may accurately determine the corrosion defect and the crackle defect of the pipeline and quantify the size of the defect, thereby realizing a comprehensive detection and evaluation on the defect.

Further, in an implementation of the present disclosure, the multi-field coupling magnetizing circuit 100 is configured to provide a saturated direct-current (DC) magnetization field via a permanent magnet or a DC coil and simultaneously provide a high-frequency alternative-current (AC) magnetization field via an AC coil.

Further, in an implementation of the present disclosure, a frequency of a high-frequency alternating-current excitation signal for providing the high-frequency alternating-current magnetization field is within a range of 20 kHz to 100 kHz, a direction of alternating-current magnetization is along a radial direction of the pipeline, and a direction of direct-current magnetization is along an axial direction of the pipeline.

Further, in an implementation of the present disclosure, the signal collecting circuit 300 includes a tri-dimensional magnetic sensor and a detection coil. The tri-dimensional magnetic sensor is configured to detect intensities of leaked magnetic fields along an axial direction, a circumferential direction and a radial direction of the pipeline. The detection coil is configured to convert the magnetic field signal at the position of the defect into an electrical impedance signal and collect the electrical impedance signal.

Further, in an implementation of the present disclosure, the signal processing 400 circuit includes an amplifier, a filter, and an analog-to-digital converter.

Further, in an implementation of the present disclosure, the device 10 according to embodiments of the present disclosure further includes a driver, for driving the signal detection circuit 200 to detect the defect of the pipeline at the constant speed; and a power supply manager, for supplying power to the signal detection circuit 200.

It should be explained that, the explanation and illustration to embodiments of the device for detecting and evaluating defect with electromagnetic multi-field coupling may be also suitable to embodiments of the device for detecting and evaluating defect with electromagnetic multi-field coupling, which is not described herein.

With the device for detecting and evaluating defect with electromagnetic multi-field coupling according to embodiments of the present disclosure, the multi-field coupling and magnetization may improve multi-directional synchronous detection capability of acquiring defect information, and may comprehensively analyze and evaluate the defect in combination with the magnetic leakage signals and the electric impedance signal. The corrosion defect and the crackle defect in the pipeline may be detected simultaneously. After the defect type is determined, the size of the defect may be quantified based on the magnetic leakage signals. Therefore, comprehensive detection and evaluation on the defect may be realized, thereby avoiding a limitation that it is unable to effectively recognize the crackle defect using a single magnetic leakage detection method, realizing a high reliability, fast detection speed, and automation. The method may be applied to detect and evaluate the defect of a ferromagnetic pipeline or steel plate, which has a broad application prospect.

In addition, terms such as "first" and "second" are used herein for purposes of description and are not intended to indicate or imply relative importance or significance. Therefore, the feature defined with "first" and "second" may explicitly or implicitly include at least one this feature. In the description of the present disclosure, the term "a plurality of" means two or more than two, unless specified otherwise.

In the description of the present disclosure, terms "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, particular features, structures, materials, or characteristics may be combined in any suitable manner in one or more embodiments or examples. Besides, any different embodiments and examples and any different characteristics of embodiments and examples may be combined by those skilled in the art without contradiction.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for detecting and evaluating defect with electromagnetic multi-field coupling, comprising:
   magnetizing, by a magnetizing circuit, a pipeline to be detected with the electromagnetic multi-field coupling;
   detecting, by a detector, a defect of the pipeline along an axial direction of the pipeline at a constant speed;
   collecting, by a signal collecting circuit, signals at a position of the defect to obtain magnetic leakage signals in three dimensions at the position and an electrical impedance signal at the position;
   pre-processing, by a signal processing circuit, the magnetic leakage signals in three dimensions and the electrical impedance signal;
   decoupling, by a processor, the pre-processed magnetic leakage signals in three dimensions and the electrical impedance signal, to obtain decoupled magnetic leakage signals in three dimensions and a decoupled electrical impedance signal;
   performing, by the processor, impedance analysis on the decoupled electrical impedance signal, and determining, by the processor, a type of the defect based on a phase angle of the decoupled electrical impedance signal; and
   performing, by the processor, a neural network defect quantification method, comprising:
      establishing a first neural network quantification model for the magnetic leakage signals of the corrosion defect; and
      establishing a second neural network quantification model for the magnetic leakage signals of the crackle defect, the second neural network quantification model being different from the first neural network quantification model;
      wherein each of the first neural network quantification model and the second neural network quantification model have an input of the decoupled magnetic leakage signals, and an output of quantitative values indicating length, width and depth of the defect.

2. The method of claim 1, wherein magnetizing the pipeline to be detected with the electromagnetic multi-field coupling further comprises:
   providing a saturated direct-current magnetization field using a permanent magnet or a direct-current coil, and providing simultaneously a high-frequency alternating-current magnetization field using an alternating-current coil, wherein a frequency of a high-frequency alternating-current excitation signal for providing the high-frequency alternating-current magnetization field is within a range of 20 kHz to 100 kHz, a direction of alternating-current magnetization is along a radial direction of the pipeline, and a direction of direct-current magnetization is along an axial direction of the pipeline.

3. The method of claim 2, wherein the pre-processed magnetic leakage signals in three dimensions and the electrical impedance signal are decoupled according to:

$$B'_x = B_x$$

$$B'_y = B_y$$

$$B'_z = \frac{E/ns - \sqrt{2}\sin(\omega t + \varphi) \cdot \nabla B_z - \sqrt{2}\,\omega\cos(\omega t + \varphi)B_z}{1 - (\sqrt{2}\sin(\omega t + \varphi)) \cdot \nabla - \sqrt{2}\,\omega\cos(\omega t + \varphi)}$$

$$E' = E - ns \cdot \nabla B_z + \nabla \cdot \left( \frac{E/ns - \nabla B_z}{(\sqrt{2}\sin(\omega t + \varphi) - 1) \cdot \nabla + \sqrt{2}\,\omega\cos(\omega t + \varphi)} \right)$$

where, $B_x'$, $B_y'$ and $B_z'$ denotes the decoupled magnetic leakage signals in three dimensions, $E'$ denotes the decoupled electrical impedance signal, x, y and z respectively denote an axial direction, a circumferential direction and a radial direction of the pipeline, ω and φ respectively denote a frequency of the high-frequency alternating-current excitation signal and an initial phase angle of the alternating-current excitation signal, n and s respectively denote a number of turns of a detection coil and an area of the detection coil, ∇ is a differential operator, $B_x$, $B_y$ and Bz respectively denotes the magnetic leakage signals in three dimensions, and E denotes the electrical impedance signal.

4. The method of claim 1, wherein collecting signals at the position of the defect further comprises:
   detecting intensities of leaked magnetic fields along an axial direction, a circumferential direction and a radial direction of the pipeline generated by a spatial magnetic field.

5. The method of claim 1, wherein performing the impedance analysis on the decoupled electrical impedance signal and determining the type of the defect based on the phase angle of the decoupled electrical impedance signal comprises:
   drawing an impedance plot based on the decoupled electrical impedance signal, and calculating a phase angle α of the decoupled electrical impedance signal based on the impedance plot, where α∈[−90°,90°];
   when −60°<α<60°, determining that the defect is a corrosion defect; and
   when −90°≤α≤−60° or 60°≤α≤90°, determining that the defect is a crackle defect.

6. A device for detecting and evaluating defect with electromagnetic multi-field coupling, comprising:
   a magnetizing circuit, for magnetizing a pipeline to be detected with the electromagnetic multi-field coupling;
   a detector, for detecting a defect of the pipeline along an axial direction of the pipeline at a constant speed;
   a signal collecting circuit, for collecting signals at a position of the defect to obtain magnetic leakage signals in three dimensions at the position and an electrical impedance signal at the position;
   a signal processing circuit, for pre-processing the magnetic leakage signals in three dimensions and the electrical impedance signal; and
   a processor, configured to decouple the pre-processed magnetic leakage signals in three dimensions and the electrical impedance signal, to obtain decoupled magnetic leakage signals in three dimensions and a decoupled electrical impedance signal; perform impedance analysis on the decoupled electrical impedance signal and determine a type of the defect based on a phase angle of the decoupled electrical impedance signal; and perform a neural network defect quantification method,
   wherein the processor is further configured to:
     establish a first neural network quantification model for the magnetic leakage signals of the corrosion defect; and
     establish a second neural network quantification model for the magnetic leakage signals of the crackle defect, the second neural network quantification model being different from the first neural network quantification model;
     wherein each of the first neural network quantification model and the second neural network quantification model have an input of the decoupled magnetic leakage signals, and an output of quantitative values indicating length, width and depth of the defect.

7. The device of claim 6, wherein the magnetizing circuit comprises:
   a permanent magnet or a direct-current coil, for providing a saturated direct-current magnetization field; and
   an alternating-current coil, for providing simultaneously a high-frequency alternating-current magnetization field.

8. The device of claim 7, wherein a frequency of a high-frequency alternating-current excitation signal for providing the high-frequency alternating-current magnetization field is within a range of 20 kHz to 100 kHz, a direction of alternating-current magnetization is along a radial direction of the pipeline, and a direction of direct-current magnetization is along an axial direction of the pipeline.

9. The device of claim 8, wherein the processor is further configured to decouple pre-processed magnetic leakage signals in three dimensions and the electrical impedance signal according to:

$$B'_x = B_x$$

$$B'_y = B_y$$

$$B'_z = \frac{E/ns - \sqrt{2}\sin(\omega t + \varphi) \cdot \nabla B_z - \sqrt{2}\,\omega\cos(\omega t + \varphi)B_z}{1 - (\sqrt{2}\sin(\omega t + \varphi)) \cdot \nabla - \sqrt{2}\,\omega\cos(\omega t + \varphi)}$$

$$E' = E - ns \cdot \nabla B_z + \nabla \cdot \left( \frac{E/ns - \nabla B_z}{(\sqrt{2}\sin(\omega t + \varphi) - 1) \cdot \nabla + \sqrt{2}\,\omega\cos(\omega t + \varphi)} \right)$$

where, $B_x'$, $B_y'$ and $B_z'$ denotes the decoupled magnetic leakage signals in three dimensions, E' denotes the decoupled electrical impedance signal, x, y and z respectively denote an axial direction, a circumferential direction and a radial direction of the pipeline, ω and φ respectively denote a frequency of the high-frequency alternating-current excitation signal and an initial phase angle of the alternating-current excitation signal, n and s respectively denote a number of turns of a detection coil and an area of the detection coil, ∇ is a differential operator, $B_x$, $B_y$ and Bz respectively denotes the magnetic leakage signals in three dimensions, and E denotes the electrical impedance signal.

10. The device of claim 6, wherein the signal collecting circuit comprises:
    tri-dimensional magnetic sensor, for detecting intensities of leaked magnetic fields along an axial direction, a circumferential direction and a radial direction of the pipeline; and
    a detection coil, for converting the magnetic field signal at the position of the defect into an electrical impedance signal and collecting the electrical impedance signal.

11. The device of claim 6, wherein the signal processing circuit comprises an amplifier, a filter, and an analog-to-digital converter.

12. The device of claim 6, further comprising:
    a driver, for driving the detector to detect the defect of the pipeline at the constant speed; and
    a power supply manager, for supplying power to the detector.

13. The device of claim 6, wherein the processor is further configured to:
    draw an impedance plot based on the decoupled electrical impedance signal, and calculate a phase angle α of the decoupled electrical impedance signal based on the impedance plot, where α∈[−90°,90°];
    when −60°<α<60°, determine that the defect is a corrosion defect; and when $-90° \leq \alpha \leq -60°$ or $60° \leq \alpha \leq 90°$, determine that the defect is a crackle defect.

* * * * *